United States Patent [19]

Durbin

[11] Patent Number: 4,583,848
[45] Date of Patent: Apr. 22, 1986

[54] IMAGING SYSTEM USING A FULL FRAME ILLUMINATION ARRAY

[75] Inventor: John A. Durbin, Webster, N.Y.

[73] Assignee: Xerox Corporation, Stamford, Conn.

[21] Appl. No.: 637,656

[22] Filed: Aug. 3, 1984

[51] Int. Cl.[4] .............................................. G03B 27/54
[52] U.S. Cl. ....................................... 355/67; 355/100
[58] Field of Search .................................. 355/67, 100

[56] References Cited

U.S. PATENT DOCUMENTS

| | | | |
|---|---|---|---|
| 3,094,910 | 6/1963 | Van Wagner et al. | 95/1.7 |
| 3,119,317 | 1/1964 | Cooper et al. | 355/100 |
| 3,212,417 | 10/1965 | Gundlach | 355/67 |
| 3,575,510 | 4/1971 | Kohashi | 355/67 |
| 3,591,283 | 7/1971 | Peisach | 355/67 |
| 3,697,177 | 10/1972 | Booth | 355/67 |
| 4,318,610 | 3/1982 | Grace | 355/14 D |

OTHER PUBLICATIONS

"Imaging at Unit Magnification with Two-Dimentional Planar Microlens Array" by N. Yamamoto et al., Jul. 1983, Tech. Digest of Int. Conf. Center, Kobe, Japan, pp. 224-227.

"Lamps and Lighting" edited by S. T. Henderson et al., published by Crane, Russak & Co., 1972, pp. 292, 293.

"Optics, A Short Course for Engineers and Scientists" by Charles S. Williams et al., John Wiley Sons, N.Y., 1972, pp. 215-228.

Primary Examiner—Monroe H. Hayes
Attorney, Agent, or Firm—Joseph R. Sakmyster

[57] ABSTRACT

A two-dimensional area array illuminator is described which illuminates a document during a full frame exposure. The array, in a preferred embodiment, containing a plurality of electroluminescent segments. The illuminating array also acts as a screening device to modulate light reflected from the document and through the illuminator. The modulated image is then projected onto a photoconductive surface.

7 Claims, 5 Drawing Figures

4,583,848

IMAGING SYSTEM USING A FULL FRAME ILLUMINATION ARRAY

BACKGROUND OF THE INVENTION

The present invention relates generally to an illumination and imaging system for a full frame document reproduction machine and, more particularly, to a two-dimensional illumination array which provides a uniform illumination level at a document plane.

Prior art full frame document illumination and imaging systems generally employ a flash lamp or series of flash lamps combined with a projection lens to provide full frame exposure of a document at a photosensitive image plane. Representative systems are disclosed in U.S. Pat. Nos. 3,697,177 (Booth) and 4,333,723 (Green et al). These prior art systems offer relatively high throughput compared to the conventional scan/rescan systems but also have several disadvantages. The flash lamps and their power supplies and quench circuits add a significant expense to the imaging system. And, typically, a large enclosed housing with reflective interior surfaces is required to enhance efficiency, adding to the system cost.

The flash lamps used in these prior art systems are all located out of the optical path; light reaches the platen by reflection from mirrors; directly from the lamps; or indirectly from reflectors associated with the lamps. The light undergoes multiple reflections from the interior reflective walls of the illumination housing. A generally uniform level of illumination is required at the document object plane which is a transparent platen in a typical reproduction device. This uniform illumination level, in practice, has proven difficult to achieve.

The present invention is directed towards a novel illumination source to be used in a full frame imaging system defined as a system in which an image of a document is formed as a complete latent image on a photoreceptor (as opposed to scanning systems where the image is incrementally formed by a linear scan/illumination technique), which does not require the use of flash lamps. The novel illumination source need not be contained in a housing and, in fact, in a preferred embodiment, can be formed integral with the document platen. The illumination source is realized by forming a two-dimensional area array of discrete light sources in the body of a transparent substrate. The substrate has dimensions corresponding to the document sizes to be reproduced and is positioned between the document and a projection lens. The light sources are energized by an electrical power source to provide a uniform level of illumination at the document/platen interface. More particularly the invention is directed to a full frame imaging system comprising:

a transparent platen for supporting a document to be copied, a projecting means for projecting a reflected image of the entire document onto a photoreceptor plane, a two-dimensional illuminator array, said array positioned between said platen and said projecting means, and means for activating said array whereby light provided by said array is directed towards, and reflected from, said document, passing through said array and projected onto said photoreceptor to form a latent image of the entire document thereon.

DESCRIPTION

Figure 1:
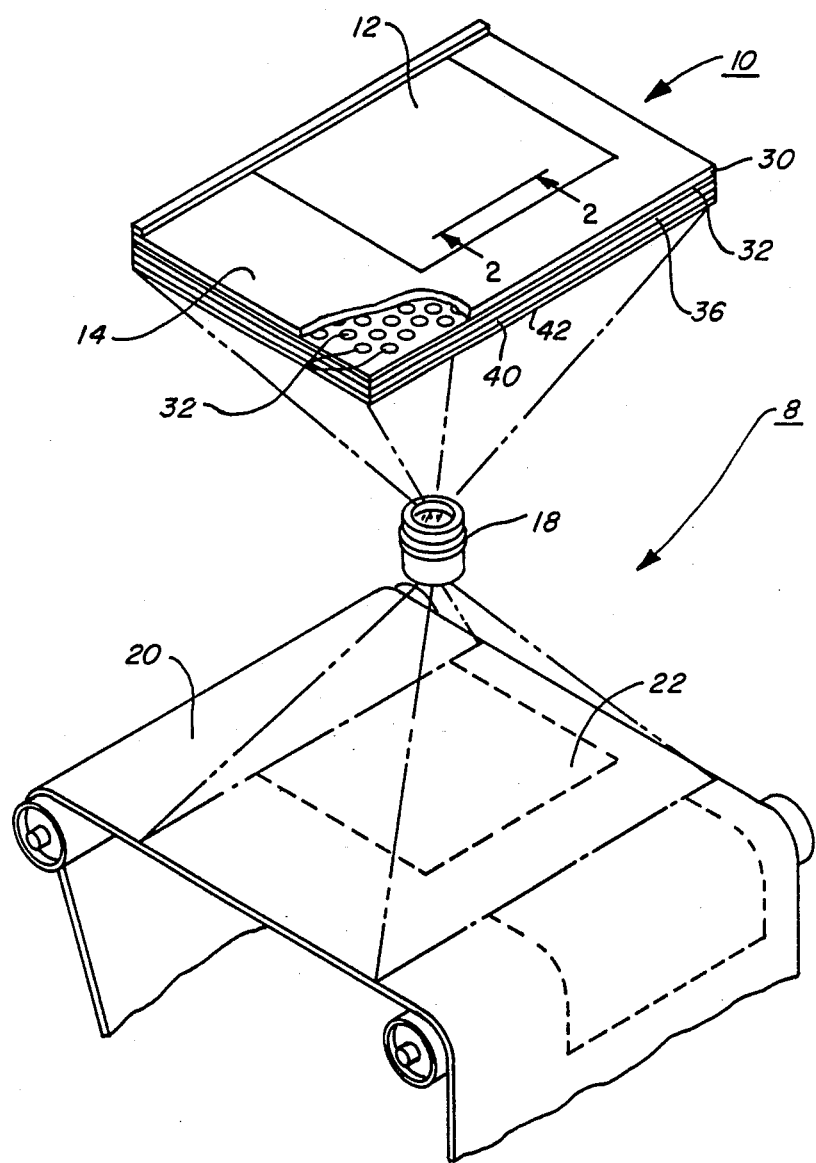
FIG. 1 is a top perspective view of a full frame imaging system utilizing a platen/illuminator array assembly according to the present invention.

Referring now to FIG. 1, there is shown a document and illumination imaging system 8. A platen and illumination assembly 10 supports a document 12 on its top surface. The document is illuminated by assembly 10 in a manner described in detail in the description of FIG. 2. Generally, however, platen assembly 10 has incorporated therein an illumination array 14 energized by a control source (not shown), to provide a uniform level of illumination at the bottom surface of the document. Light reflected from document 12 is transmitted through assembly 10 and is projected, by lens 18, onto the surface of a photoreceptor belt 20, forming a latent image 22 of the entire document. Latent image 22 can be developed, transferred to a recording substrate sheet and a permanent image affixed, as is known in the art. These various xerographic steps, as well as charging and cleaning of the belt 20, are well known in the xerographic art and are disclosed, for example, in U.S. Pat. No. 4,318,610 whose contents are hereby incorporated by reference.

Figure 2:
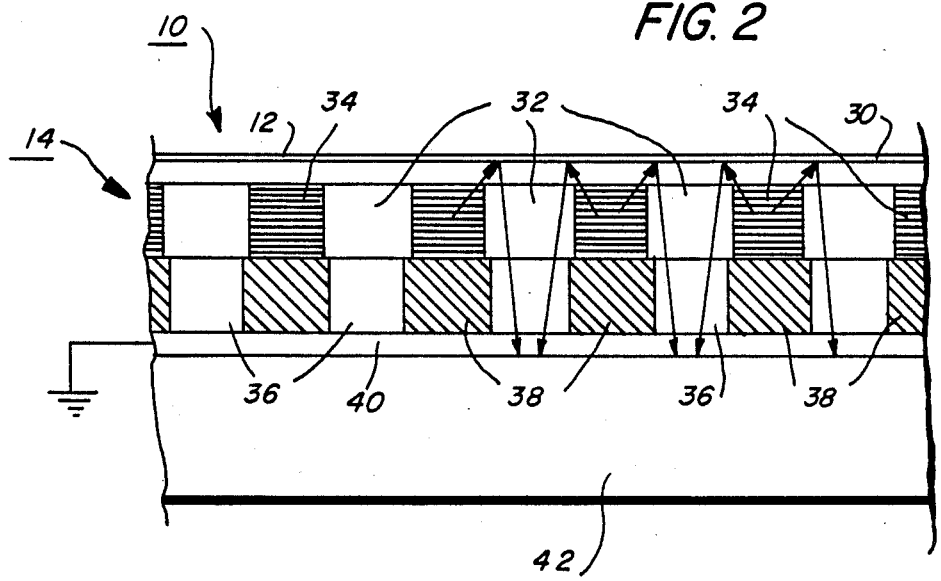
FIG. 2 is a cross-sectional view of the array assembly of FIG. 1.

Referring to FIGS. 1 and 2, layer 14 comprises a first transparent conductive electrode layer 30, a first transparent insulating layer 32 having dispersed therethrough a plurality of circular electroluminescent segments 34 forming a dot pattern, a second transparent insulating layer 36 having a plurality of insulating, light-absorbing segments 38 dispersed therethrough a second transparent conductive layer electrode 40, and a transparent glass layer 42. A control voltage (not shown) is connected between layer 30 and grounded layer 36. Layers 30, 40 may be made, for example, of tin oxide, either alone or in a transparent substrate. Segments 38 may be, for example, black resin or other 80%+ light absorbing substance. Segments 38 may be any of the well-known phosphor materials such as magnesium-activated zinc sulfide in a binder. The layer may be sequentially formed on the bare glass layer 42 by known thin film dispertion techniques, e.g. the techniques described in the text "Lamps and Lighting" edited by S. T. Henderson et al, published by Crane, Russak & Co., Inc. 1972 are appropriate.

Referring then to FIGS. 1 and 2, it can be observed that platen and illumination assembly 10 act as both an illumination source and as a multiplicative screening device. The illumination is provided by applying the appropriate potential between electrode layers 30 and 40 causing activation of the electroluminescent segments 34 dispersed through layer 32. The light absorbing segments 38 formed in layer 36 block direct viewing of the segments 34 from the lens. Light from segments 34 is thus reflected from the document and is transmitted through the non-illuminating portion of the assembly; i.e. through all interstitial portions of the assembly not blocked by segments 34 and underlying light absorbing segments 38. A modulated, or finely divided, light image of the document is then projected by lens 18 to form a modulated image at photoreceptor belt 20.

Since the assembly 10 also operates as a screening device, the segments 16 geometry and distribution (frequency) must be selected so as to produce a modulated image of the required exposure at the surface of belt 20. The frequency and array of the electroluminescent segment pattern is determined by the frequency response function for a given system and specifically the Modulation Transfer Function (MTF) of the particular lens. The relationship between spatial frequency and optical response function is disclosed in "Optics, A Short Course For Engineers and Scientists", by Charles S. Williams and Orville A. Beckhead, John Wileyan Sons, N.Y., 1972 at pages 215–228. The contents of this reference are hereby incorporated by reference.

For a system using a lens having a scan field angle of 40°, and f#10, 8×10 substrate has formed therein a plurality of circular segments covering 50% of the area. The segment frequency is 10 segments/mm.

While the FIGS. 1 and 2 embodiments disclosed the platen illuminator assembly acting as a multiplicative screen, the assembly can be modified to make the screen portions, formed by segments 34 and 38, at least partially transmissive to light. This can be accomplished by forming segments 38 of a partially transmissive, instead of completely opaque, material i.e. absorption should be less than 80%. This embodiment would enhance the efficiency of the system by providing a higher exposure level at the photoreceptor.

Figure 3:
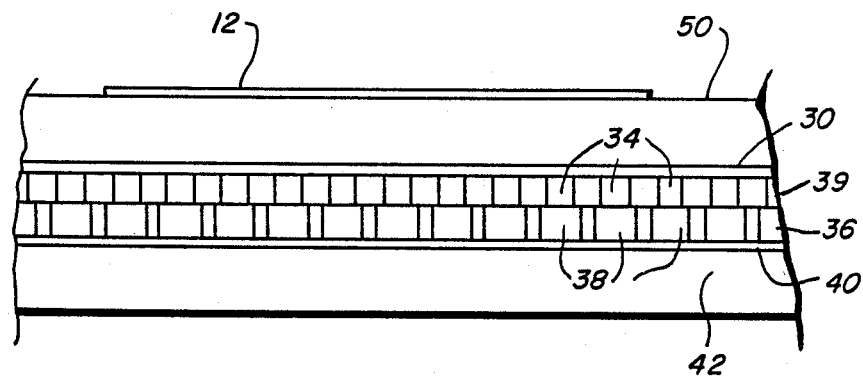
FIG. 3 is a second embodiment of the array assembly of FIGS. 1 and 2.

FIG. 3 is a cross-sectional view of another embodiment of a combined platen/illumination assembly. This embodiment is identical to that of FIG. 1 except for the introduction of another glass layer 50 between layer 30 and the document. An advantage of this embodiment is it causes a defocussing of the electroluminescent pattern so that larger segment sizes may be utilized and still not print out. Also, a more uniform platen illumination is achieved and the illuminator is better protected.

Figure 4:
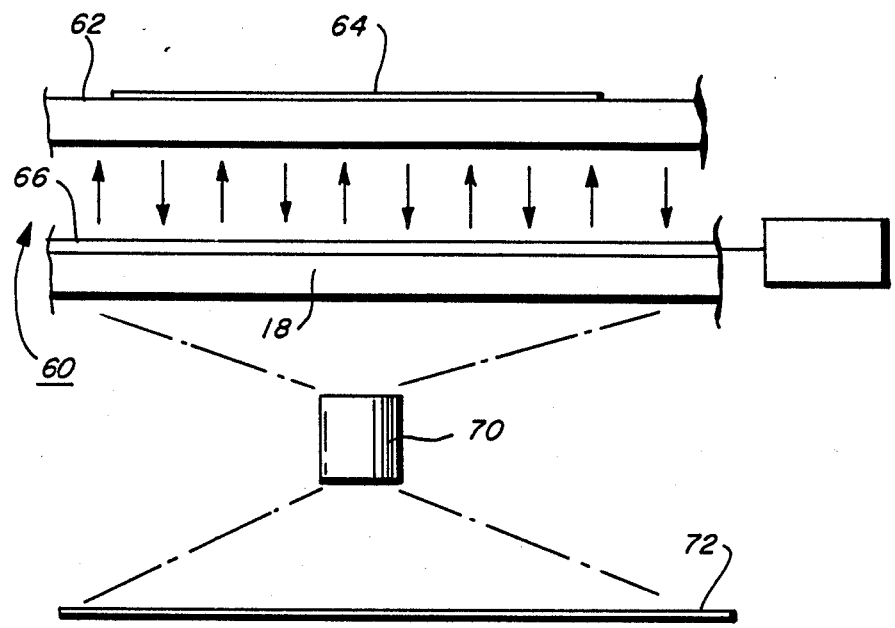
FIG. 4 shows the array assembly of FIG. 1 separated from the platen.

While the invention has thus far described in terms of an integral platen/illuminator assembly, the illuminator can be used as a separate component of an illumination system. FIG. 4 shows a side view of an imaging and illumination system 60 comprising a platen 62 for supporting a document 64. Full frame illumination panel 66 is placed beneath, but does not form a part of, platen 62. Panel 66 is formed on a glass substrate 68 and consists of layers 30–40, as previously described. The distance between panel 66 and platen 62 would be in the order of 1 to 10 mm. Optical reflectors may be placed at the edges of the platen/panel gap to increase efficiency. As in the previous embodiment, light is reflected as a modulated full frame image, through wide angle lens 70 onto the surface of photoreceptor belt 72.

A still further embodiment of the invention is shown in FIG. 40.

Figure 5:
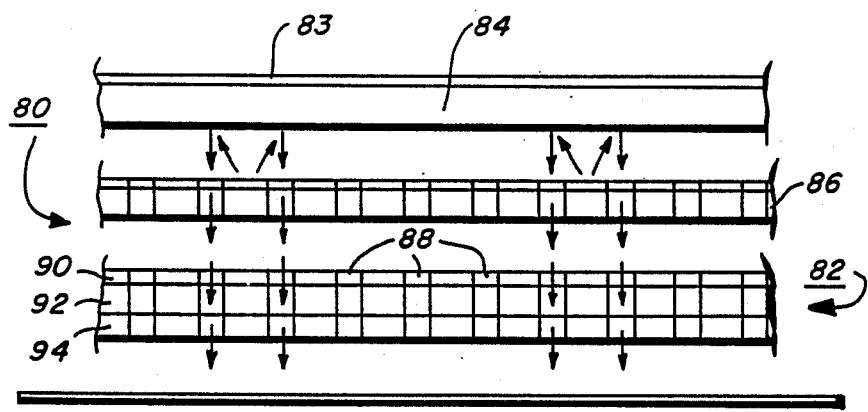
FIG. 5 is a side view of an imaging system using a short focal length lens array in cooperation with the array assembly of the invention.

FIG. 5 shows a side view of an imaging and illumination system 80 employing a short focal length, full frame imaging array 82. As shown, a document 83 is supported in the top surface of platen 84. An illuminator panel 86, constructed according to the principles of the invention, is positioned beneath platen 84 and in close proximity to the top surface of array 82. Lens array 82 comprises a plurality of microlenses 88 formed within the body of a generally opaque substrate 90, 92, 94. The array is constructed according to the principles disclosed in a paper presented July 4, 1983 at the 4th Topical Meeting on "Gradient Index Optical Imaging Systems". The paper is printed on pages 224–227 of the Technical Digest of that conference; the contents of this paper are herein incorporated by references. The transmitting portions of array 86 may be positioned in optical alignment with the microlenses 88. The object-to-lens and lens-to-photoreceptor distance can be determined by those skilled in the art; the screening frequency of panel 86 can be determined by the techniques in the Williams et al. article, referenced supra.

In summary, Applicant has disclosed a novel, full frame illumination panel which is used in conjunction with a document projection lens to form a latent image of a document at the surface of a photoreceptor. The illumination panel is relatively inexpensive to manufacture; requires a low level of power to activate; can be formed integral with a document support panel, or separate therefrom and can be used either with a conventional wide angle lens or with a full frame short focal length lens array system.

While the invention has been particularly described and shown with reference to preferred embodiments thereof, it is to be understood by those skilled in the art that variations and modifications may be made without departing from the spirit of the invention.

For example, while the preferred geometry of the electroluminescent segments was circular, the invention is also intended to encompass areas of uniform density forming other geometrical shapes such as ellipses, squares, triangles, etc. And while the addressable light sources have been described as electroluminescent segments, other light sources may be utilized. For example, light emitting diodes (LEDs) and miniature series lamps, with appropriate energy circuits, could be used.

What is claimed is:

1. A full frame imaging system comprising:
   a transparent glass platen for supporting a document to be copied,
   a projecting means for projecting a reflected image of the entire document onto a photoreceptor,
   a two-dimensional illuminator array, said array positioned between said platen and said projecting means, and
   means for activating said array whereby light provided by said array is directed towards, and reflected from, said document, passing through said array and projected onto said photoreceptor to form a latent image of the entire document thereon.

2. The imaging system of claim 1 wherein said illuminator array is integral with said platen to form a platen illuminator assembly.

3. The imaging system of claim 1 wherein said projecting means is a wide angle lens.

4. The imaging system of claim 1 wherein said projecting means is a short focal length, full frame array.

5. The imaging system of claim 1 wherein the illuminator array incorporates addressable electroluminescent segments.

6. The imaging system of claim 1 wherein said illuminator array is separated from said platen by a distance of from 1 to 10 mils.

7. The imaging system of claim 4 wherein said illuminator array is separated from said platen.

* * * * *